(12) United States Patent
Liu et al.

(10) Patent No.: US 11,904,379 B2
(45) Date of Patent: Feb. 20, 2024

(54) DEVICE FOR AUTOMATICALLY INSETTING TUBE INTO BENDING DIE

(71) Applicant: SANOH INDUSTRIAL CO., LTD., Tokyo (JP)

(72) Inventors: Jining Liu, Koga (JP); Kazuhiko Nakazato, Koga (JP); Takaaki Habu, Koga (JP); Kazuyuki Haraga, Koga (JP)

(73) Assignee: SANOH INDUSTRIAL CO., LTD., Tokyo (JP)

( * ) Notice: Subject to any disclaimer, the term of this patent is extended or adjusted under 35 U.S.C. 154(b) by 897 days.

(21) Appl. No.: 16/960,342

(22) PCT Filed: Oct. 9, 2018

(86) PCT No.: PCT/JP2018/037538
§ 371 (c)(1),
(2) Date: Jul. 7, 2020

(87) PCT Pub. No.: WO2019/163187
PCT Pub. Date: Aug. 29, 2019

(65) Prior Publication Data
US 2020/0368801 A1 Nov. 26, 2020

(30) Foreign Application Priority Data
Feb. 22, 2018 (JP) ................ 2018-030027

(51) Int. Cl.
*B21D 7/02* (2006.01)
*B29C 53/08* (2006.01)
(Continued)

(52) U.S. Cl.
CPC .............. *B21D 7/02* (2013.01); *B29C 53/083* (2013.01); *B29B 13/024* (2013.01); *B29L 2023/22* (2013.01)

(58) Field of Classification Search
CPC ......... B21D 7/02; B29C 53/083; B29C 53/80; B29C 53/08; B29C 31/002; B29C 31/008;
(Continued)

(56) References Cited

U.S. PATENT DOCUMENTS 2,305,951 A * 12/1942 Carl .................... B21D 9/03
72/159
5,553,148 A * 9/1996 Werle .................. H04R 5/023
381/151
(Continued)

FOREIGN PATENT DOCUMENTS

| CN | 101044012 | * 9/2007 | .................. 264/339 |
| JP | H09-164586 A | 6/1997 | |
| JP | 2011-079318 A | 4/2011 | |

*Primary Examiner* — Nahida Sultana
(74) *Attorney, Agent, or Firm* — POSZ LAW GROUP, PLC (57) ABSTRACT

An object of the present invention is to propose a device capable of automatically insetting a tube into a bending die instead of doing so manually, even if the shape of a product exceeds two meters in length, the device comprising a bending die having a tube insetting portion, and a traveling body that includes a guide mechanism guiding a tube to an upper portion of the tube insetting portion, an auxiliary guide mechanism keeping the tube in the upper portion of the tube insetting portion, a insetting roll insetting the tube in the tube insetting portion, a pair of drive wheels rolling along lower rails, and a drive mechanism, wherein the traveling body moves and insets a tube into the bending die while having the auxiliary guide mechanism and the drive wheels grip the bending die.

12 Claims, 9 Drawing Sheets

(51) Int. Cl.
*B29B 13/02* (2006.01)
*B29L 23/00* (2006.01)

(58) Field of Classification Search
CPC ....... B29C 31/08; B29C 57/00; B29B 13/024; B29L 2023/22; B29D 23/00; B29K 2101/12; Y10S 264/04
USPC .......................................................... 425/393
See application file for complete search history.

(56) References Cited

U.S. PATENT DOCUMENTS 7,171,835 B2 * 2/2007 Nakazato ................. B21D 9/05
72/369
2003/0042655 A1 3/2003 Kane

* cited by examiner

DEVICE FOR AUTOMATICALLY INSETTING TUBE INTO BENDING DIE

CROSS REFERENCE TO RELATED APPLICATIONS

This application is a U.S. national stage of International Patent Application No. PCT/JP2018/037538 filed on Oct. 9, 2018 and is based on Japanese Patent Application No. 2018-030027 filed on Feb. 22, 2018, the disclosures of which are incorporated herein by reference.

TECHNICAL FIELD

There exists a technique that heats up, for example, a thermoplastic resin tube, inserts the thermoplastic resin tube into a bending die and hardens the thermoplastic resin tube, in order to produce a bent pipe such as an oil feed pipe for an automobile. The present invention relates to a device for automatically insetting a tube into a bending die in order to create such bent pipe.

BACKGROUND ART

A bending die has been used to form a tube into a predetermined shape by hardening a tube made of thermoplastic resin while bending the tube in a predetermined shape. The bending die has been produced by combining, for example, a plurality of steel plates and welding these steel plates into a desired shape. Another way to produce a bending die is to press a flat steel plate into a desired shape.

PTL 1 discloses the following technique.

A desired shape of a bending die is manufactured by extruding an aluminum material to produce a U-shaped tube having a U-shaped cross section, insetting a rod-shaped, plastic core made of thermoplastic resin of a predetermined hardness into the U-shaped tube, bending the U-shaped tube in this state by using a bender, and thereafter removing the core. Then, the thermoplastic resin tube that is extruded into a straight tube is insetted and set inside this bending die, which is then heated and bent, to obtain a bent tube having a predetermined bent shape.

As a prior art in relation to this technology, PTL 1 also discloses a bending die having a rectangular cross section with an opened upper surface.

PTL 2 discloses a bending die in which a groove having a semicircular cross section is milled on a non-flat upper surface of the bending die. Also, PTL 3 discloses a bending die formed by punching out a groove having a substantially C-shaped cross section.

CITATION LIST

Patent Literature

[PTL 1] Japanese Patent Application Laid-open No. H09-164586
[PTL 2] Japanese Patent Application Laid-open No. 2011-79318
[PTL 3] US 2003/0042655A1

SUMMARY OF INVENTION

Technical Problem

For example, a conventional technique has been performed in which, in order to produce a product of a predetermined shape by manually insetting a tube made of thermoplastic resin into a bending die having a U-shaped cross section and then heating the tube, a heating medium (gas or liquid) is poured into the tube and heated beforehand, and then the heated tube is manually inserted into the bending die. In such a technique, a hot tube is put in a bending die manually, posing a risk of burn injury, hence poor workability. Therefore, there is a need for a method for automatically inserting a tube into a bending die without relying on manual work.

The bending dies described in the prior art are configured such that a tube is manually insetted therein. Specifically, using the judgement and skills of a worker, a tube is insetted into a bending die having a complex shape, to make a product thus having a complex shape. However, it is not easy to inset a considerably long product, such as a tube exceeding two meters in length, into a bending die, and it is practically impossible to do so. Moreover, in some cases, bending dies with complex shapes that are bent freely in three-dimensional space cannot be realized with the manufacturing methods disclosed in PTL 1, PTL 2, and PTL 3.

The present invention was contrived in view of the challenges faced by the background art described above, and an object of the present invention is to propose a device for automatically insetting a tube into a bending die, which is capable of automatically insetting a tube into a bending die instead of doing so manually, by causing a traveling body to move along the bending die, even if the shape of a product exceeds two meters in length.

Solution to Problem

In order to achieve the object described above, the present invention provides a device for automatically insetting a tube into a bending die described in [1] to [12] below:

[1] A device for automatically insetting a tube into a bending die, comprising a bending die having a tube insetting portion, and a traveling body moving while gripping the bending die, wherein the traveling body has: a guide mechanism that extends from an upper portion of the bending die to below a lower portion of the bending die in a direction perpendicular to a longitudinal direction of the bending die in such a manner as to sandwich both sides of the bending die, and guides a tube to an upper portion of the tube insetting portion; an auxiliary guide mechanism that keeps the tube at the upper portion of the tube insetting portion of the bending die while sliding along a pair of upper rails that are provided on both sides of the tube insetting portion of the bending die; a insetting roll that insets the tube into the tube insetting portion of the bending die while rotating along the upper portion of the tube insetting portion; a pair of drive wheels that roll along a pair of lower rails provided on a rear side of the pair of upper rails of the bending die; and a drive mechanism that is driven to rotate the insetting roll and the drive wheels.

[2] The device for automatically insetting a tube into a bending die according to [1] above, wherein the guide mechanism is configured by a pair of vertical bars, tips of which are bent in an inverted U-shape in a direction away from the bending die.

[3] The device for automatically insetting a tube into a bending die according to [1] above, wherein the guide mechanism is pressed against the bending die by a spring.

[4] The device for automatically insetting a tube into a bending die according to [1] above, wherein the auxiliary guide mechanism is a horizontal bar that is disposed in a direction perpendicular to the longitudinal direction of the bending die and directly above the upper rails on the both sides.

[5] The device for automatically insetting a tube into a bending die according to [1] above, wherein the auxiliary guide mechanism is configured by two horizontal bars that are arranged at a front portion and a rear portion of a traveling direction of the traveling body, respectively.

[6] The device for automatically insetting a tube into a bending die according to [1] above, wherein the auxiliary guide mechanism is pressed against the upper rails by a spring.

[7] The device for automatically insetting a tube into a bending die according to [1] above, wherein when positions of the lower rails and positions of the drive wheels are viewed along a cross section perpendicular to the longitudinal direction of the bending die, and with reference to a line drawn from a center O of the tube insetting portion of the bending die to a rear-side section which is a rear-side region corresponding to an opening, $0<\alpha \leq 90°$ and $0<\beta \leq 90°$ are established, where $\alpha$ and $\beta$ represent angles between lines drawn from the center O to the lower rail portions and the drive wheels.

[8] The device for automatically insetting a tube into a bending die according to [1] above, wherein the drive mechanism includes a differential device, and rotational driving force is transmitted from the drive mechanism to the pair of drive wheels via the differential device.

[9] The device for automatically insetting a tube into a bending die according to [1] above, wherein the insetting roll is driven to rotate by the drive mechanism about a rotation axis in a direction perpendicular to the longitudinal direction of the bending die while pushing the tube into the tube insetting portion in the opening of the bending die.

[10] The device for automatically insetting a tube into a bending die according to [1] above, wherein the bending die is a bending die having a smooth shape formed by virtually and continuously moving, in three-dimensional space, a profile including a substantially circular-shaped first closed curve having a recess portion, and the tube insetting portion is formed by the recess portion.

[11] The device for automatically insetting a tube in a bending die according to [10] above, wherein the profile including the first closed curve internally includes a second closed curve composed of a closed curve, and a heat medium hole is formed by the second closed curve.

[12] The device for automatically insetting a tube into a bending die according to [1] above, wherein the bending die is created by a three-dimensional printing technique using metal.

Advantageous Effects of Invention

According to the device for automatically insetting a tube into a bending die according to the present invention, a tube can automatically be insetted into a bending die instead of manually, by causing a traveling body to move along the bending die, even if the shape of a product exceeds two meters in length.

DESCRIPTION OF EMBODIMENTS

A device for automatically insetting a tube into a bending die according to the present invention is described hereinafter with reference to the drawings.

Figure 1:
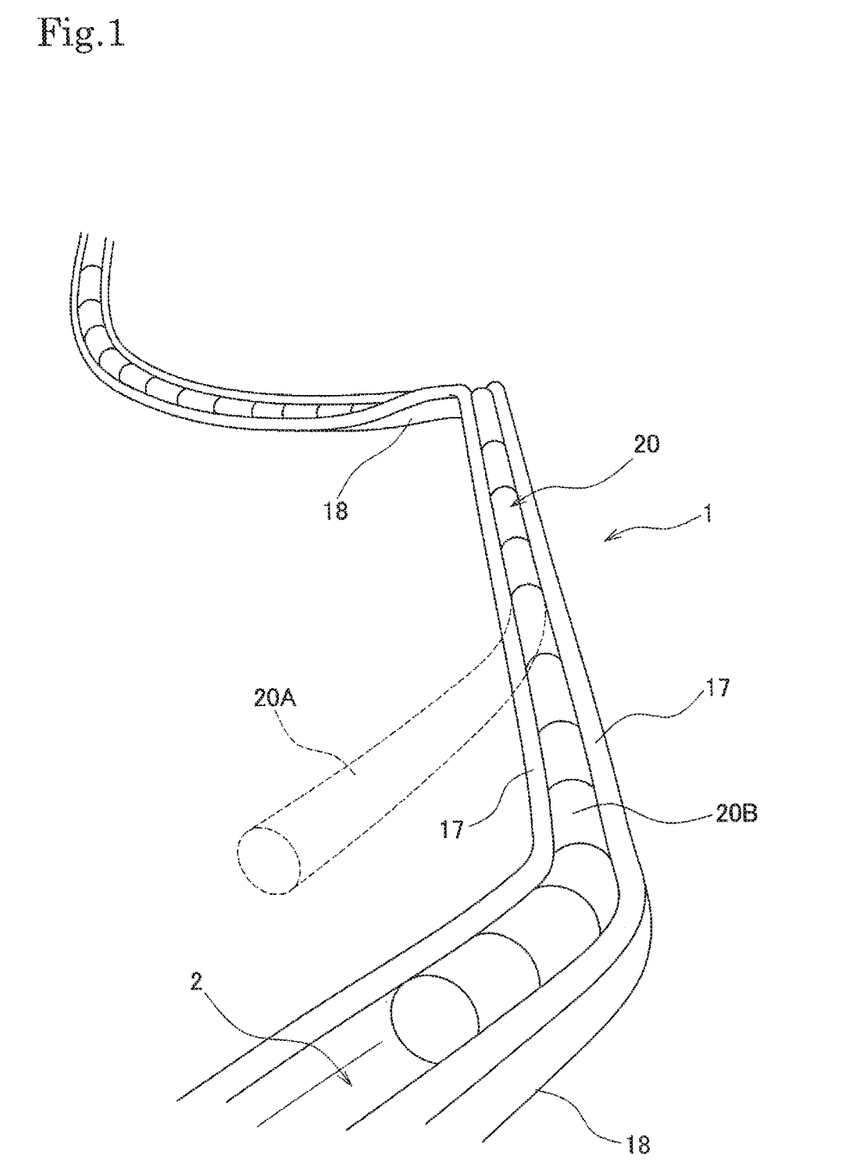
FIG. 1 is a schematic perspective view showing an example of a bending die which is a component of a device for automatically insetting a tube into a bending die according to the present invention.

FIG. 1 is a schematic perspective view showing an example of a bending die which is a component of a device for automatically insetting a tube into a bending die according to the present invention. This drawing does not show a frame for supporting a bending die 1, and a traveling body and the like described hereinafter in detail. In FIG. 1, a state 20A in which a tube 20 is not yet insetted into a tube insetting portion 2 of the bending die 1 is shown by a broken line, and a state in which the tube 20 is insetted is shown by a solid line 20B. The present invention provides a device for automatically insetting a tube in the state 20A into the tube insetting portion 2 to obtain the state 20B.

Figure 2:
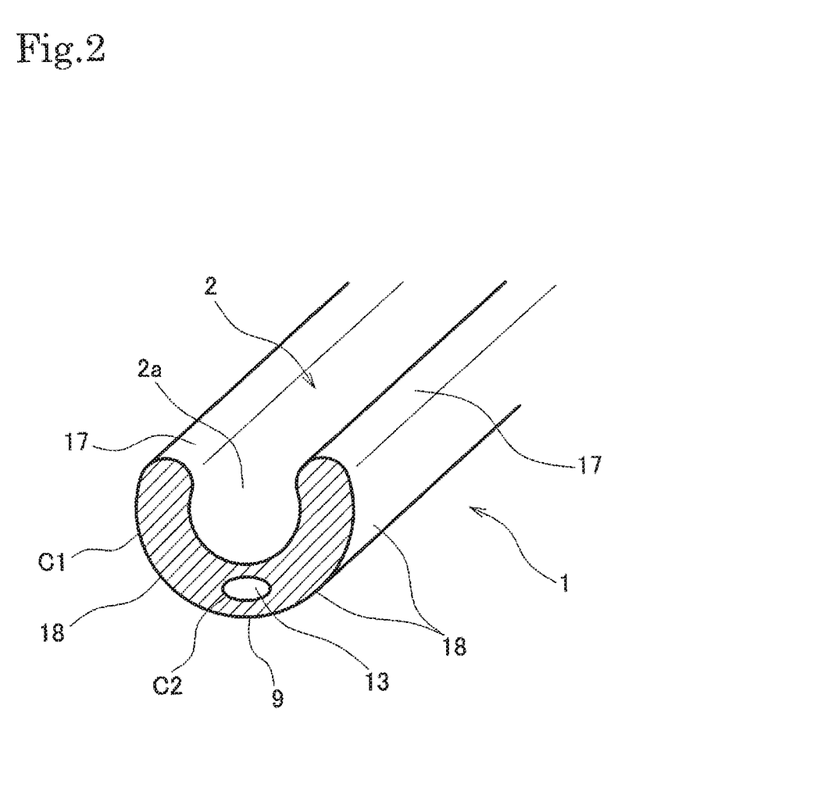
FIG. 2 is a partial enlarged perspective view of the bending die shown in FIG. 1.

FIG. 2 is a partial enlarged perspective view showing an example of the bending die 1 used in the present invention. As shown in the diagram, a tube insetting recess portion 2a is formed in the tube insetting portion 2 of the bending die 1. It is preferred that the cross-sectional shape of the tube insetting recess portion 2a be substantially constant throughout the entire tube insetting recess portion 2a in order to inset an unshown tube whose cross-sectional shape is substantially constant throughout the entire tube. Therefore, the cross-sectional shapes (particularly the cross-sectional shape of the insetting recess portion 2a) perpendicular to a longitudinal direction of the bending die 1 are substantially constant at all times. Specifically, cross sections of different parts of the bending die 1 in each of FIGS. 1 and 2 have substantially the same cross-sectional shape. However, an attachment for fixing the bending die 1 to the frame or the like, which is not shown, has an accompanying structure in addition to the insetting recess portion 2a; thus, the cross-sectional shape thereof is different.

Figure 3:
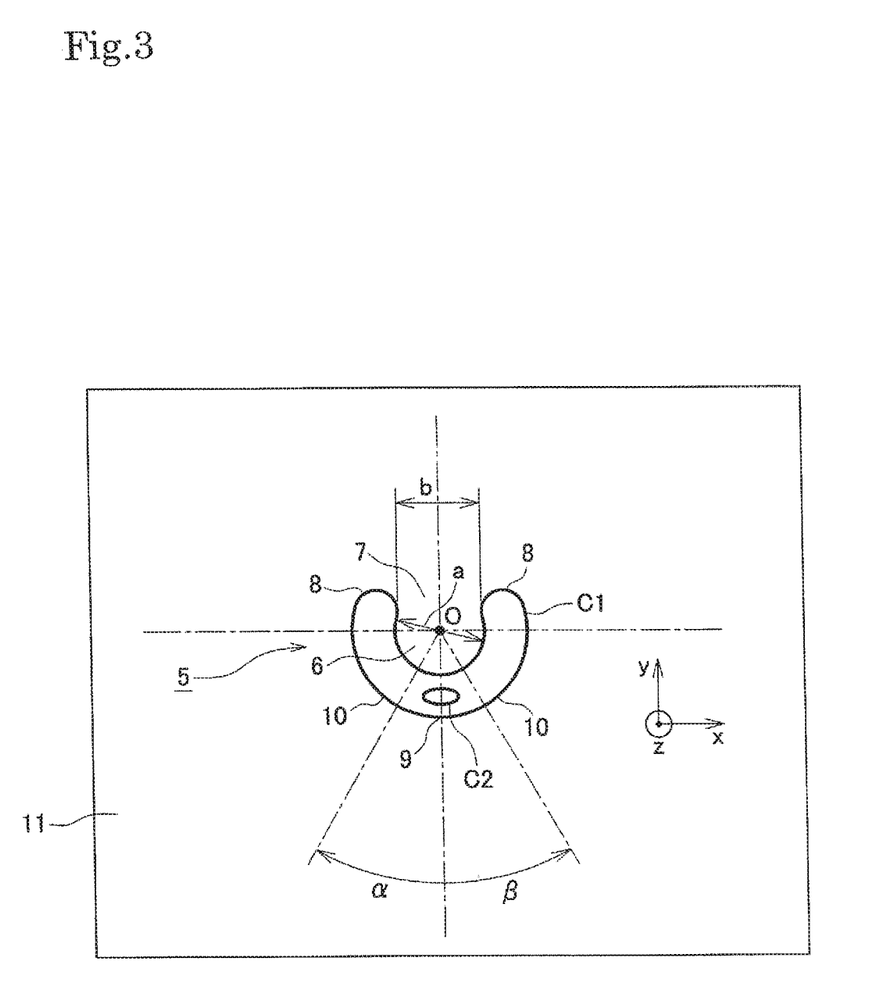
FIG. 3 is a front view showing an example of a profile.

The shape of the bending die 1 shown in FIGS. 1 and 2 is created by continuously moving, in three-dimensional space, a profile 5 that includes a substantially circular-shaped first closed curve C1 having a recess portion such as the one shown in FIG. 3. In this specification, a two-dimensional figure that creates the cross-sectional shape of the bending die is referred to as "profile." The cross section that shows the profile of the bending die is referred to as "profile surface."

As shown in FIG. 3, the profile 5 has a planar shape that includes the substantially circular-shaped first closed curve C1 having a recess portion. The profile 5 shown in FIG. 3 includes a recess portion 6, an opening 7, upper rail portions 8, 8 adjacent to both sides of the opening 7, a rear-side section 9 of the opening 7, and lower rail portions 10, 10 adjacent to both sides of the rear-side section 9. It is preferred that a groove width a of the recess portion 6 be designed to be slightly wider than an opening width b of the recess portion 6. In this manner, a tube that is already insetted into the tube insetting portion 2 formed by the recess portion 6 can be prevented from being easily removed. With reference to a line drawn from a center O of the recess portion 6 to the rear-side section 9, $0<\alpha\leq90°$ and $0<\beta\leq90°$ are established, where $\alpha$ and $\beta$ represent the angles between the lines drawn from the center O to the lower rail portions 10, 10. Preferably, $\alpha=\beta$ and $10<\alpha\leq70°$ are established, and more preferably $\alpha=\beta$ and $20<\alpha\leq60°$ are established. The profile 5 including the first closed curve C1 may internally include a second closed curve C2 composed of a closed curve. The bending die 1 in which a heat medium hole is formed can be realized by continuously moving the first closed curve C1 and the second closed curve C2 in three-dimensional space. FIG. 2 is a diagram showing the bending die 1 having a heat medium hole 13.

In order to make the following description more easily understandable, two orthogonal directions are set within a plane 11 including the profile 5. As shown in FIG. 3, for example, the direction of a symmetry axis of the first closed curve C1 of the profile 5 is taken as a y direction, and the direction perpendicular to the y direction is taken as an x direction. The direction perpendicular to the x direction and the y direction within three-dimensional space is taken as a z direction. In general, the bending die used in the present invention has a shape generated by continuously moving, in three-dimensional space, one profile which is a two-dimensional figure. Typical examples of the continuous movement of the profile within three-dimensional space include parallel translation, a turning or tilting movement which is a combination of a change in the direction of the profile surface and parallel translation of the profile, a twisting movement which is a combination of in-plane rotation and parallel translation of the profile surface, or a combination of all these movements. Note that the y direction and the x direction fixed in the profile 5 appear to change as the profile moves, when viewed in three-dimensional space fixed outside. Naturally, the z direction perpendicular to the x direction and the y direction appears to change as well.

The movements of the profile 5 in the present invention are not limited to the movements described above, and may be any movement that is continuous, smooth, and unidirectional without changing the shape of the profile 5. For example, movements or the like that combine the movements described above are included as well.

These movements are virtually executed during design. Based on these virtual movements, the shape of the bending die 1 is determined, to create a design drawing thereof. Numerical data of this shape are created, and based on the data, the bending die 1 is created by a three-dimensional printing technique using metal (such as aluminum, stainless steel). Since the three-dimensional printing technique using metal is well-known, a detailed description thereof is omitted herein. The material is not limited to metal; any material can be used as long as it meets conditions such as heat resistance. The present specification uses the term "unit bending die," which indicates a short bending die, and a long bending die can be created by connecting short bending dies. In other words, short unit bending dies are connected to create a long bending die. Bending dies and unit bending dies are created by means of three-dimensional printing. Since the three-dimensional printing technique is employed, the tube insetting portion 2, attachments for the frame, and other members accompanying each bending die or unit bending die can integrally be formed for each bending die.

In the bending die according to the present invention, a traveling body can be used as a self-propelled tube insetting device. Before explaining the traveling body, a correspondence relationship in shapes between the profile 5 and the bending die 1 is now explained. The recess portion 6 and the opening 7 of the first closed curve C1 of the profile 5 of FIG. 3 forming the bending die 1 correspond to the tube insetting portion 2 shown in FIG. 1. The upper rail portions 8, 8 adjacent to both sides of the opening 7 shown in FIG. 3 correspond to a pair of upper rails 17, 17 shown in FIG. 2. The lower rail portions 10, 10 adjacent to both sides of the rear-side section 9 shown in FIG. 3 correspond to a pair of lower rails 18, 18 shown in FIG. 2.

The shape formed by moving the profile 5 of FIG. 3 within three-dimensional space forms the pair of upper rails 17, 17 and the pair of lower rails 18, 18 around the bending die 1, the upper rails 17, 17 and the lower rails 18, 18 extending along the tube insetting portion 2, as shown in FIGS. 1 and 2. The tube is tentatively placed in the tube insetting portion 2 by the structure of the bending die 1, and thereafter a slider is caused to slide along the upper rails 17 and the lower rail 18, whereby the tube 20 can be insetted into the tube insetting portion 2 easily and securely. In the present invention, the slider is realized as the traveling body that moves along these upper rails 17 and lower rails 18. The structure and functions of the traveling body are described hereinafter with reference to FIGS. 4 to 9.

As described above, the pair of upper rails 17, 17 are formed on both sides of the insetting recess portion 2a of the tube insetting portion 2 of the bending die 1, and the pair of lower rails 18, 18 are formed on both sides of the rear-side section of the insetting recess portion 2a. As shown in FIGS. 4 to 7, a traveling body 21 travels along the bending die 1 while gripping the bending die 1 by using a pair of auxiliary guide mechanisms 22a, 22b and a pair of drive wheels 23, 23.

The auxiliary guide mechanisms 22a and 22b are realized by two horizontal bars, respectively. The auxiliary guide mechanism 22a is disposed at a front portion of a traveling direction A of the traveling body 21, whereas the auxiliary guide mechanism 22b is disposed at a rear portion of the same. The auxiliary guide mechanisms 22a and 22b are arranged in the traveling body 21 while in contact with the pair of upper rails 17, 17 located in the upper portions of the bending die 1 and in a direction perpendicular to the upper rails 17. The auxiliary guide mechanisms 22a and 22b are constantly pressed from the traveling body 21 toward the upper rails 17 of the bending die 1 by compression springs 22c and 22d, respectively. When the two auxiliary guide mechanisms 22a and 22b are arranged in contact with the pair of upper rails 17, 17 in the direction perpendicular thereto, it means that the traveling body 21 is pressed in contact with four points of the upper rails in the upper portions of the bending die 1.

The pair of drive wheels 23, 23, on the other hand, roll along the pair of lower rails 18, 18 located in lower portions of the bending die 1. At the middle position between the auxiliary guide mechanisms 22a and 22b with respect to the traveling direction of the traveling body 21, the pair of drive wheels 23, 23 are in contact with the pair of lower rails 18, 18. Specifically, the drive wheels 23 are in contact with the bending die 1 at two sections in the lower portions of the bending die 1.

When the traveling body 21 is in contact with the four points of the upper rails 17 of the bending die 1 via the horizontal bars 22a and 22b which are the auxiliary guide mechanisms, and is in contact with the two sections of the lower rails 18 of the bending die 1 via the drive wheels 23 located at the middle position with respect to the traveling direction A of the traveling body 21, and when the auxiliary guide mechanisms 22a and 22b are constantly pressed in the direction of the bending die 1 by the springs 22c and 22d, it means that the traveling body 21 grips the bending die 1 by a total of six points, i.e., the four points on the upper rails 17 and the two points on the lower rails 18.

Since the traveling body 21 moves along the bending die 1 while gripping the bending die 1, the drive wheels 23 are driven to rotate by a drive mechanism. In the embodiment shown in FIGS. 4 to 7, an output of an electric motor 25 functioning as the drive mechanism is transmitted to an input shaft of a differential device (embedded in a insetting roll 30 described hereinafter) 27 via a first gear system 26. A rotating shaft of the electric motor 25 is disposed in the direction perpendicular to the longitudinal direction of the bending die 1, and directions of the input shaft and output shafts of the differential device 27, too, are disposed in the direction perpendicular to the longitudinal direction of the bending die 1. Therefore, the first gear system 26 is configured by a spur gear. Although not shown in FIGS. 4 to 7, the differential device 27 is disposed inside the insetting roll 30 present between the electric motor 25 and the bending die 1, the insetting roll 30 being described hereinafter.

Figure 4:
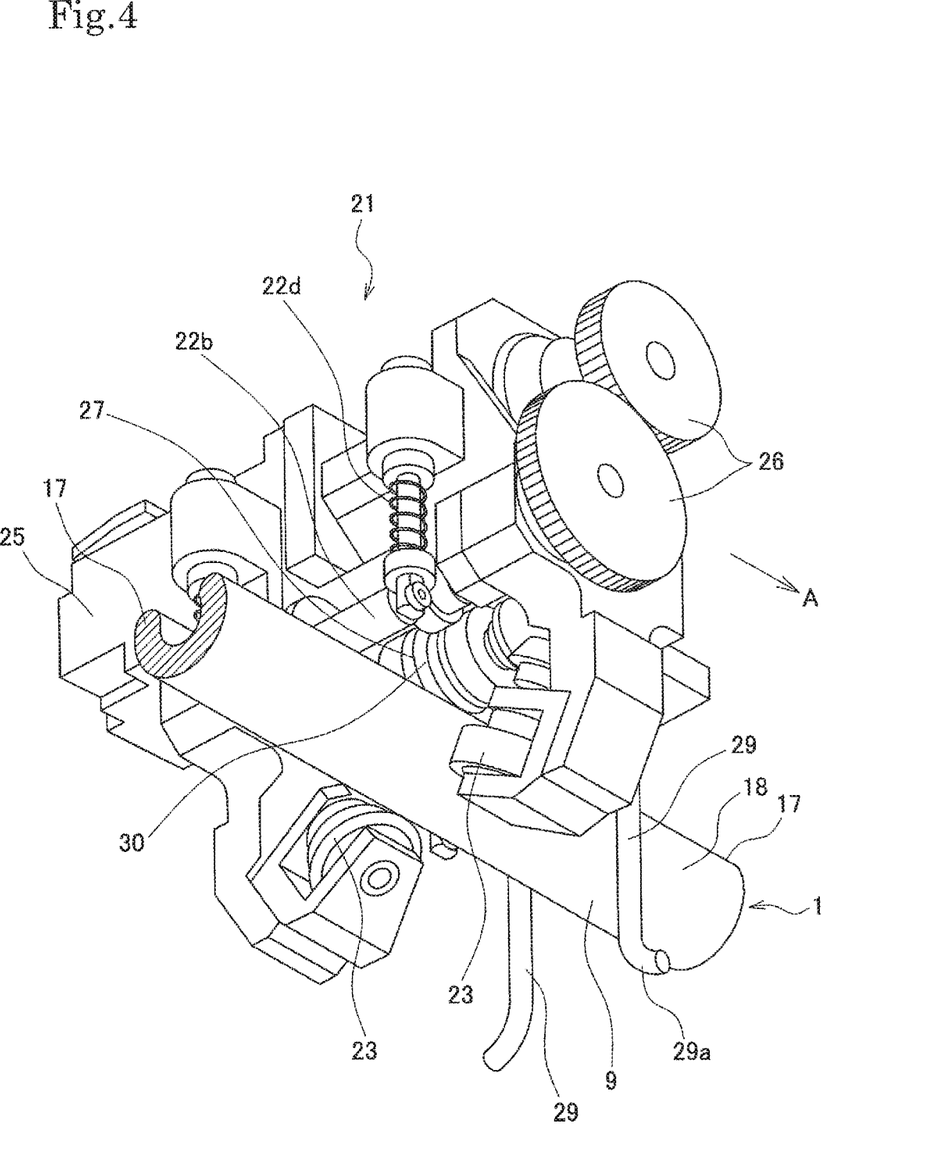
FIG. 4 is a schematic perspective view showing an example of a traveling body which is a component of the device for automatically insetting a tube into a bending die according to the present invention.
Figure 5:
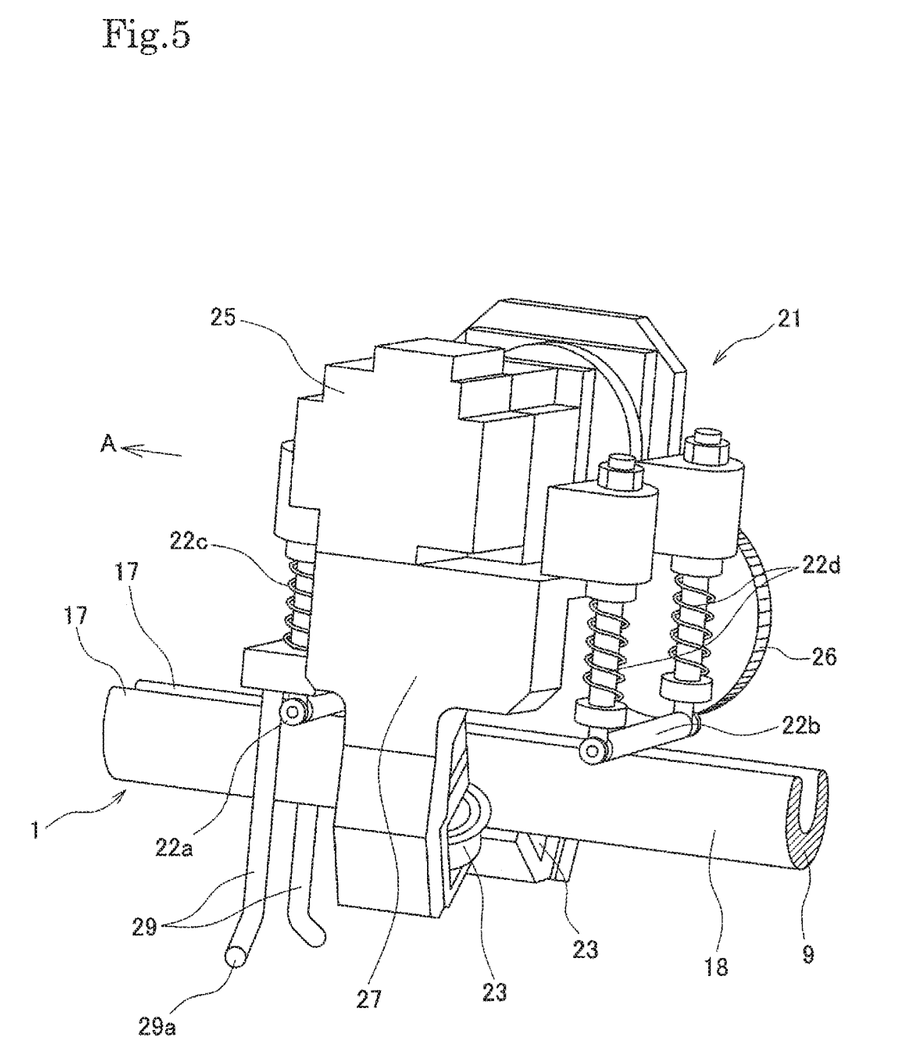
FIG. 5 is a schematic perspective view showing the traveling body of FIG. 4 from a different direction.
Figure 6:
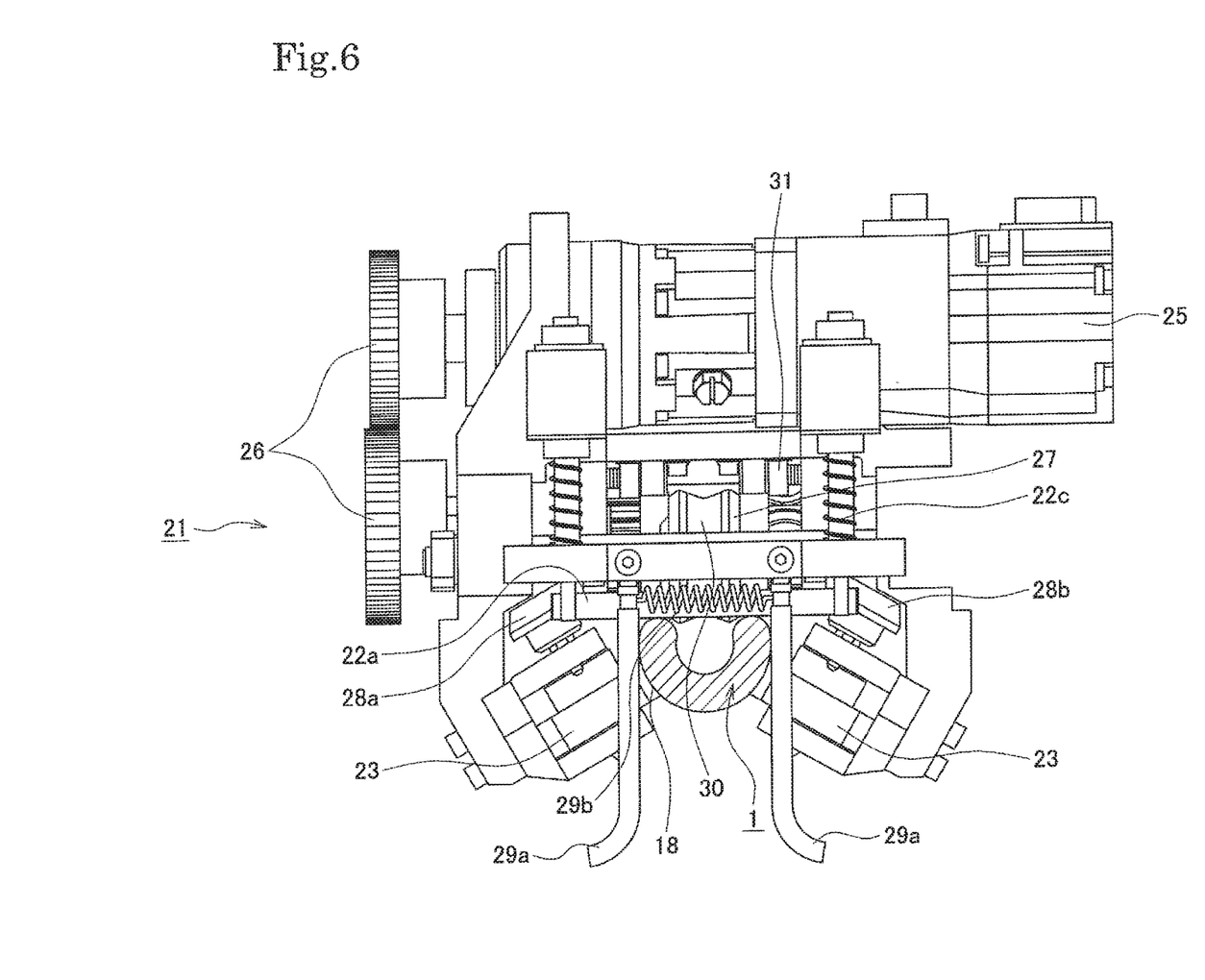
FIG. 6 is a schematic front view of the traveling body shown in FIG. 4.
Figure 7:
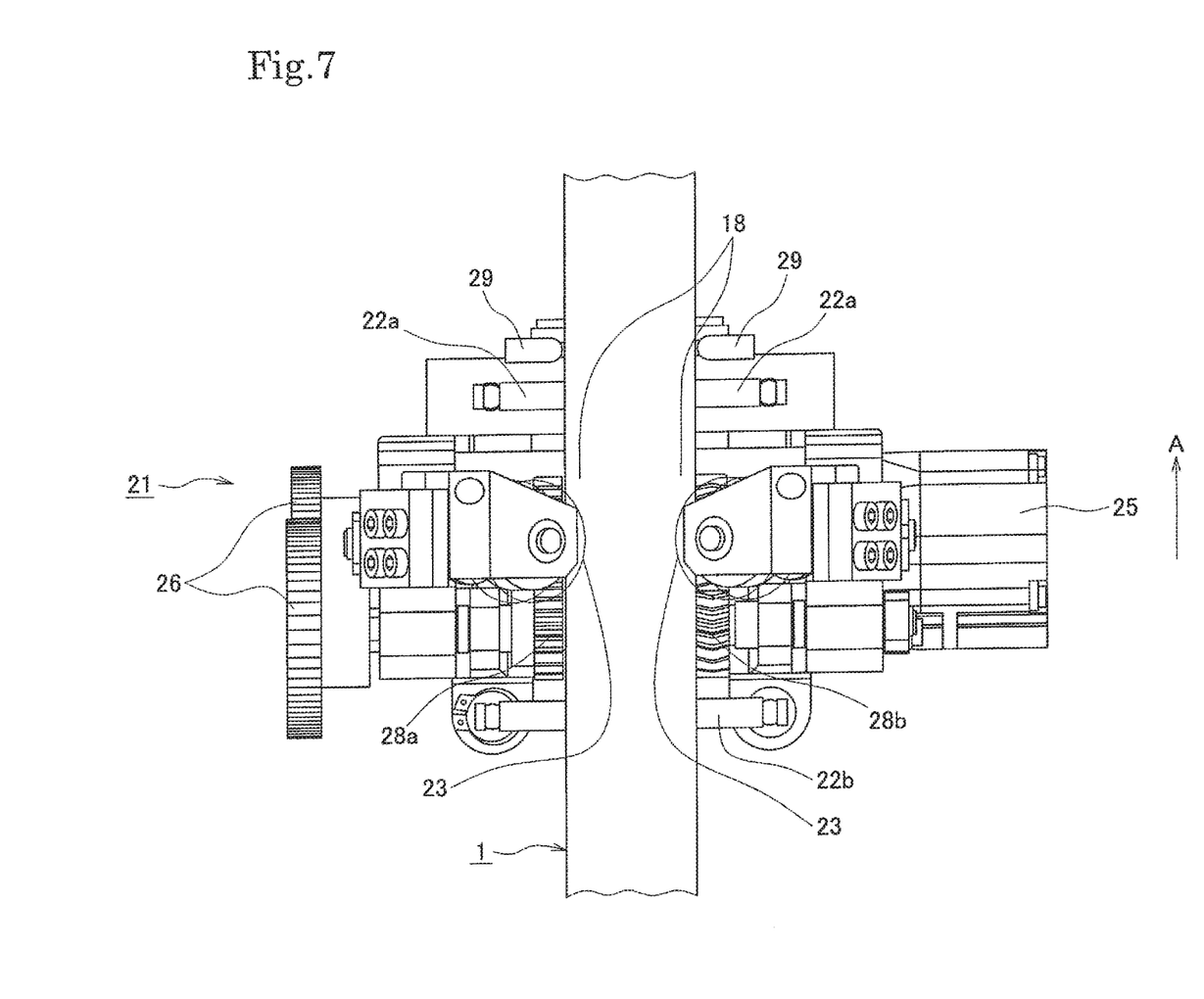
FIG. 7 is a schematic bottom view of the traveling body shown in FIG. 4.

Rotary outputs from the two output shafts of the differential device 27 are transmitted to the two drive wheels 23, 23 via second gear systems 28a and 28b, respectively. As can be seen in FIGS. 4 and 6, the two drive wheels 23, 23 are in abutment with the lower rails 18 of the bending die 1. Specifically, the drive wheels 23 come into abutment with the bending die 1 obliquely from below the bending die 1. In order to achieve this abutment, the second gear systems 28a and 28b that couple the output shafts of the differential device 27 to the two drive wheels 23 each include a bevel gear as a component.

As described with reference to FIG. 3, with reference to the line drawn from the center O of the recess portion 6 of the profile 5 to the rear-side section 9 (the rear-side region corresponding to the opening), $0<\alpha \leq 90°$ and $0<\beta \leq 90°$ are established, where $\alpha$ and $\beta$ represent the angles between the lines drawn from the center O to the lower rail portions 10, 10. Preferably, $\alpha=\beta$ and $10<\alpha \leq 70°$ are established, and more preferably $\alpha=\beta$ and $20<\alpha \leq 60°$ are established. In response, with reference to the line drawn from the center O of the recess portion 6 to the rear-side section 9, the two drive wheels 23 can securely grip the bending die 1 by designing the bending die 1 in such a manner that the plane forming the angles $\alpha$ and $\beta$ includes a plane of rotation of the drive wheels.

Once the drive wheels 23 are driven to rotate, the traveling body 21 moves along the bending die 1 while gripping the bending die 1. Since the rotation output of the electric motor 25 is transmitted to the drive wheels 23 via the differential device 27, the inner wheel difference between the left and right drive wheels 23, 23 that occurs when the traveling body 21 turns a curve of the bending die 1 is absorbed. As a result, even if the bending die 1 is bent up and down and left and right in three-dimensional space or twisted about the longitudinal axis as shown in FIG. 1, the traveling body 21 can travel along the bending die 1 by securely following the shape of the bending die 1 without facing an obstacle caused by the inner wheel difference.

The traveling body 21 is a device for automatically insetting, into the bending die 1, the portion 20A of the tube 20 indicated by the broken line in FIG. 1, the portion 20A being a part that has not yet been insetted into the bending die 1. The traveling body 21 insets the tube 20 into the bending die 1 as follows, to create the state shown by 20B in FIG. 1.

The traveling body 21 has a pair of guide mechanisms 29, 29 at the front portion of the traveling direction. In the embodiment shown in FIGS. 4 to 7, the guide mechanisms 29 are realized by vertical bars that are arranged so as to be perpendicular to the longitudinal direction of the bending die 1 and to extend from the vicinity of the upper rails 17 of the bending die 1 to below the bending die along side surfaces of the bending die 1 in such a manner as to sandwich the bending die 1 therebetween. Also, in this embodiment, tip portions 29a of the two vertical bars configuring the guide mechanisms 29 extend outwardly away from the bending die 1. Specifically, the tip portions of the vertical bars are bent into an inverted U-shape in the direction away from the bending die. Further, a tension spring 29b is disposed between the vertical bars configuring the guide mechanisms 29, wherein the vertical bars are pressed against the bending die 1 by this tension spring 29b.

Figure 8:
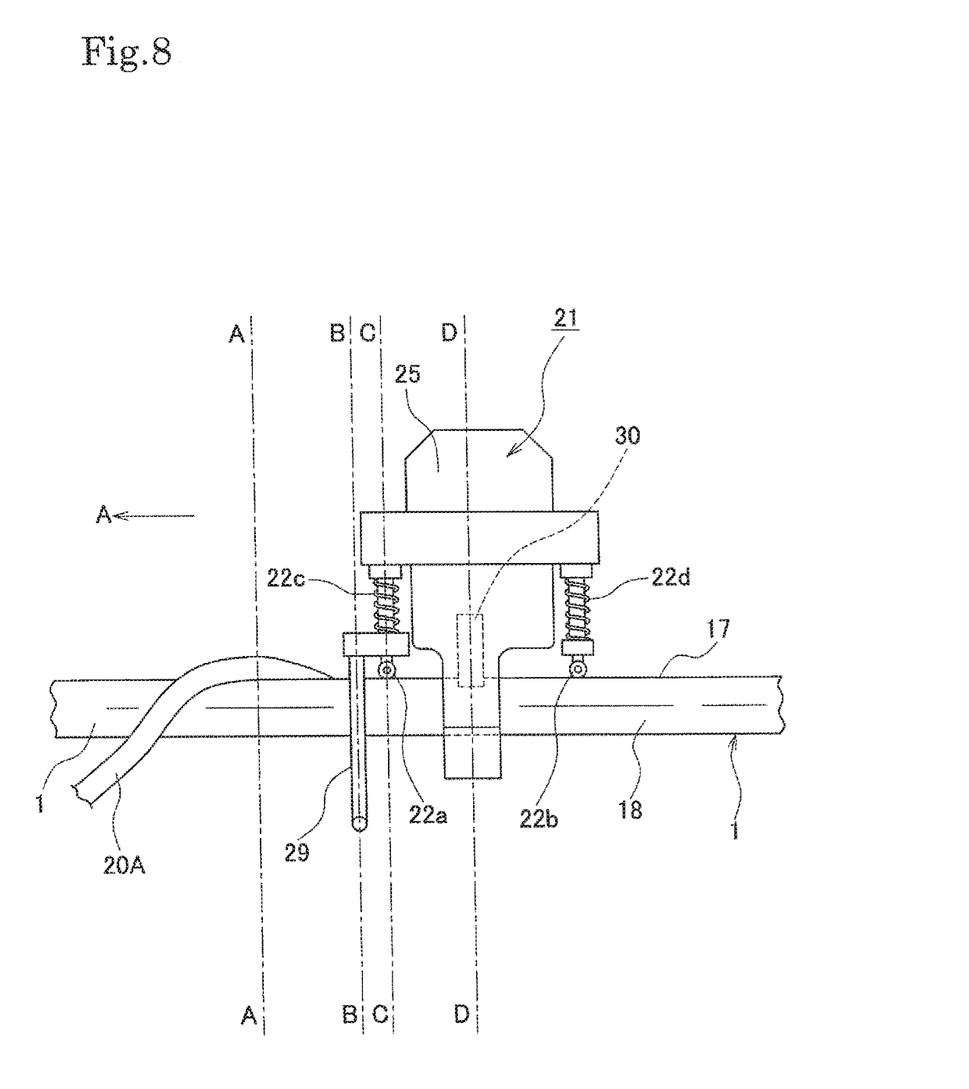
FIG. 8 is a schematic side view of the traveling body and the bending die, explaining a tube insetting operation performed on the bending die.
Figure 9:
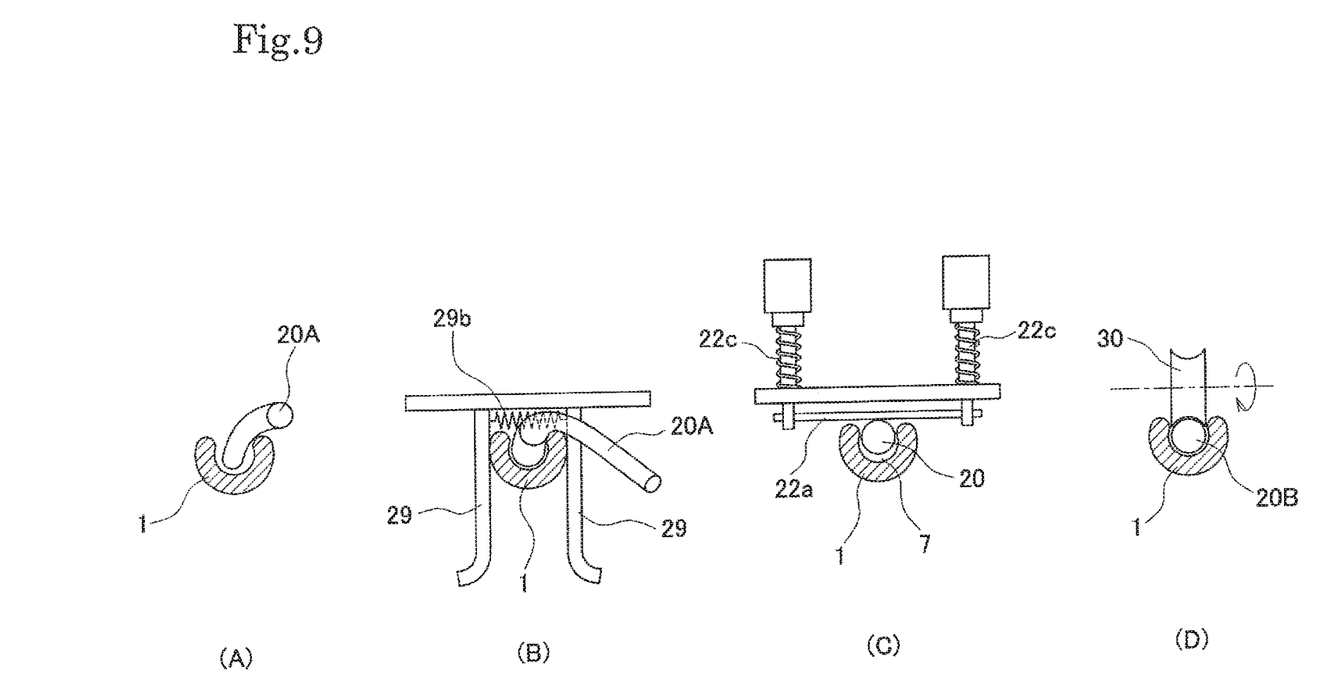
FIG. 9 is a schematic cross-sectional diagram taken along each of lines shown in FIG. 8, where (A) is a diagram taken along a cross section A of FIG. 8, (B) a diagram taken along a cross section B of FIG. 8, (C) a diagram taken along a cross section D of FIG. 8, and (D) a diagram taken along a cross section D of FIG. 8.

FIG. 8 is a schematic side view of the traveling body 21 and the bending die 1 for explaining the tube insetting operation performed on the bending die. FIG. 9 is a schematic front view along the longitudinal direction of the bending die, showing the relation among the bending die, the traveling body, and the tube in various cross sections. As shown in FIG. 9(A) showing the cross section A of FIG. 8, the portion 20A of the tube of FIG. 1, which is detached from the bending die 1, is scooped up by the guide mechanisms 29 as the traveling body 21 travels forward, and the portion 20A is then moved to the upper portion of the bending die 1, as shown in FIG. 9(B) showing the cross section B of FIG. 8. In this case, since the guide mechanisms 29 are constantly pressed against the bending die 1 by the spring 29b, the guide mechanisms 29 come into contact with the bending die 1 even when the traveling body travels on the curve of the bending die, whereby the guide mechanisms 29 can scoop up the tube with no problems.

As shown in FIGS. 8 and 9, the tube 20A that is moved to the upper portion of the bending die 1 by the vertical bars of the guide mechanisms 29 enters the opening 7 of the bending die 1 (see FIG. 3), wherein an upper surface of the tube is held by the auxiliary guide mechanism 22a provided at the front portion of the traveling direction of the traveling body 21, and this state is maintained. As described above, since the auxiliary guide mechanism 22a is pressed in the direction of the bending die 1 by the spring 22c, the tube 20 can securely be kept in this position. This state is shown in FIG. 9(C) showing the cross section C of FIG. 8.

The traveling body 21 has the insetting roll 30 (see FIG. 4) between the front and rear auxiliary guide mechanisms 22a and 22b. A rotation axis of the insetting roll 30 is perpendicular to the longitudinal direction of the bending die 1 and parallel to the guide mechanisms 29. The insetting roll 30 is driven to rotate via a third gear system 31 by the electric motor 25 which is the drive mechanism. In this case, the position of the insetting roll 30 on the rotation axis needs to be fixed so that the insetting roll 30 opposes the opening 7 of the bending die 1. It is preferred that the traveling body 21 have a compact shape. To emphasize the compactness, the third gear system 31 is realized by a gear system including, for example, an angled screw, so that rotary power is transmitted from the drive mechanism to the insetting roll while positioning the insetting roll 30.

A tip of the insetting roll 30 enters the opening 7 of the bending die 1 and pushes the tube 20 kept in the opening 7 of the bending die 1, toward the recess portion 6 (see FIG. 3) of the bending die 1 while rotating. This state is shown in FIG. 9(D) showing the cross section D of FIG. 8.

As shown in FIG. 3, by making the opening width b of the recess portion 6 narrower than the groove width a of the recess portion 6, the tube 20B that is pushed in can be prevented from being removed easily from the bending die 1. Since the other auxiliary guide mechanism 22b is provided at the rear portion of the traveling direction of the traveling body 21, the tube 20B that is pushed in can be prevented from being removed from the bending die 1. The auxiliary guide mechanism 22b provided at the rear portion of the traveling direction of the traveling body 21 functions to maintain the balance of the traveling body 21 during traveling. The tube 20 can automatically be insetted in the recess portion 6 by causing the traveling body 21 to travel along the bending die 1 as described above.

Not only is it possible to realize a power supply line and a control signal line of the electric motor 25, which is the drive mechanism, as overhead lines, but also the frame supporting the bending die 1, which is not shown, can be attached. A battery can be used as the power supply. Signals can be sent wirelessly.

In the embodiment shown in FIGS. 4 to 7, the power source of the drive mechanism is the electric motor 25. However, the power source is not limited to the electric motor, and other power sources such as pneumatic devices can be used to implement the device of the present invention. The control signal line of the electric motor 25 can be realized as aerial wiring, or a signal communication device disposed along the bending die, or to control wireless electromagnetic waves.

In a case where the tube 20 is not flexible, the tube 20 can be made flexible by pouring a heated fluid or the like into the tube prior to insetting the tube into the bending die 1, or a heat medium can be poured into the heat medium hole 13 formed in the bending die 1 and the temperature thereof can be controlled so that buckling of the tube can be avoided. Furthermore, any type of differential device can be used as the differential device 27 used in the present device, as long as the inner wheel difference can be eliminated.

The device for automatically insetting a tube into a bending die according to the present invention was described above in detail. However, needless to say, objects to which the present invention can be applied are not limited to those illustrated in the drawings; the present invention can be implemented as other forms of devices and methods with the same technical idea.

INDUSTRIAL APPLICABILITY

According to the device for automatically insetting a tube into a bending die according to the present invention, a tube can automatically be insetted into the bending die instead of manually, by causing the traveling body to move along the bending die, even if the shape of a product exceeds two meters in length. Thus, the present invention can be widely used for bending a variety of long, resin or metal pipes and hoses that are used particularly as automobile parts and the like.

REFERENCE SIGNS LIST

1 Bending die
2 Tube insetting portion
2a Insetting recess portion
5 Profile
6 Recess portion
7 Opening
8 Upper rail portion
9 Rear-side section of opening
10 Lower rail portion
13 Heat medium hole
17 Upper rail
18 Lower rail
20 Tube
20A Tube before being insetted into tube insetting portion
20B Tube after being insetted into tube insetting portion
21 Traveling body
22a, 22b Auxiliary guide mechanism
22c, 22d Compression spring
23 Drive wheel
25 Electric motor
26 First gear system
27 Differential device
28a, 28b Second gear system
29 Guide mechanism
29a Tip portion of vertical bar
29b Tension spring
30 Insetting roll
31 Third gear system
C1 First closed curve
C2 Second closed curve
A Traveling direction
a Opening width of recess portion
b Groove width of recess portion
O Center of recess portion

The invention claimed is:

1. A device for automatically insetting a tube into a bending die, comprising
    a bending die having a tube insetting portion, and
    a traveling body moving while gripping the bending die, wherein the traveling body includes:
    a guide mechanism that extends from an upper portion of the bending die to below a lower portion of the bending die in a direction perpendicular to a longitudinal direction of the bending die in such a manner as to sandwich both sides of the bending die and guides the tube to an upper portion of the tube insetting portion;
    an auxiliary guide mechanism that keeps the tube at the upper portion of the tube insetting portion of the bending die while sliding along a pair of upper rails that are provided on both sides of the tube insetting portion of the bending die;
    an insetting roll that insets the tube into the tube insetting portion of the bending die while rotating along the upper portion of the tube insetting portion;
    a pair of drive wheels that roll along a pair of lower rails provided on a rear side of the pair of upper rails of the bending die; and a drive mechanism that is driven to rotate the insetting roll and the drive wheels.

2. The device for automatically insetting a tube into a bending die according to claim 1, wherein the guide mechanism is configured by a pair of vertical bars, tips of which are bent in an inverted U-shape in a direction away from the bending die.

3. The device for automatically insetting a tube into a bending die according to claim 1, wherein the guide mechanism is pressed against the bending die by a spring.

4. The device for automatically insetting a tube into a bending die according to claim 1, wherein the auxiliary guide mechanism is a horizontal bar that is disposed in a direction perpendicular to the longitudinal direction of the bending die and directly above the upper rails on the both sides.

5. The device for automatically insetting a tube into a bending die according to claim 1, wherein the auxiliary guide mechanism is configured by two horizontal bars that are arranged at a front portion and a rear portion of a traveling direction of the traveling body, respectively.

6. The device for automatically insetting a tube into a bending die according to claim 1, wherein the auxiliary guide mechanism is pressed against the upper rails by a spring.

7. The device for automatically insetting a tube into a bending die according to claim 1, wherein when positions of the lower rails and positions of the drive wheels are viewed along a cross section perpendicular to the longitudinal direction of the bending die, and with reference to a line drawn from a center O of the tube insetting portion of the bending die to a rear-side section which is a rear-side region corresponding to an opening, $0<\alpha \leq 90°$ and $0<\beta \leq 90°$ are established, where $\alpha$ and $\beta$ represent angles between lines drawn from the center O to the lower rail portions and the drive wheels.

8. The device for automatically insetting a tube into a bending die according to claim 1, wherein the drive mechanism includes a differential device, and rotational driving force is transmitted from the drive mechanism to the pair of drive wheels via the differential device.

9. The device for automatically insetting a tube into a bending die according to claim 1, wherein the insetting roll is driven to rotate by the drive mechanism about a rotation axis that is perpendicular to the longitudinal direction of the bending die while pushing the tube into the tube insetting portion in the opening of the bending die.

10. The device for automatically insetting a tube into a bending die according to claim 1, wherein the bending die is a bending die having a smooth shape formed by virtually and continuously moving, in three-dimensional space and has a profile including a substantially circular-shaped first closed curve having a recess portion, and the tube insetting portion is formed by the recess portion.

11. The device for automatically insetting a tube in a bending die according to claim 10, wherein the profile including the first closed curve internally includes a second closed curve composed of a closed curve, and a heat medium hole is formed by the second closed curve.

12. The device for automatically insetting a tube into a bending die according to claim 1, wherein the bending die is created by a three-dimensional printing technique using metal.

* * * * *